R. H. BOLIN.
GLASS DRAWING FURNACE.
APPLICATION FILED MAR. 22, 1909.
1,163,585.  Patented Dec. 7, 1915.
3 SHEETS—SHEET 3.
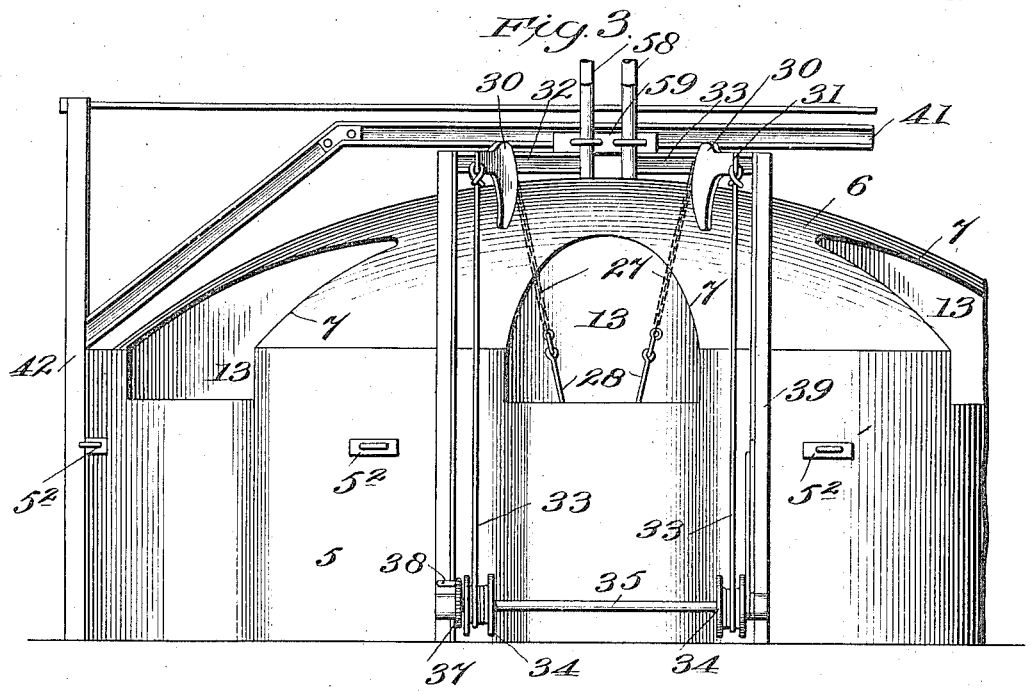
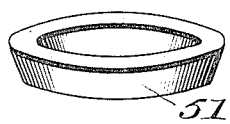
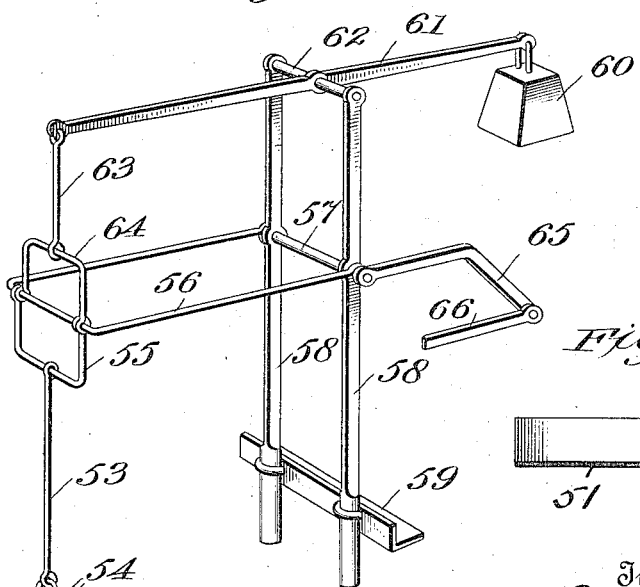
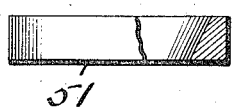
Witnesses
Geo. H. Byrd
John H. Holch
Inventor
R. H. Bolin
by Adrian Azer
his Attorney

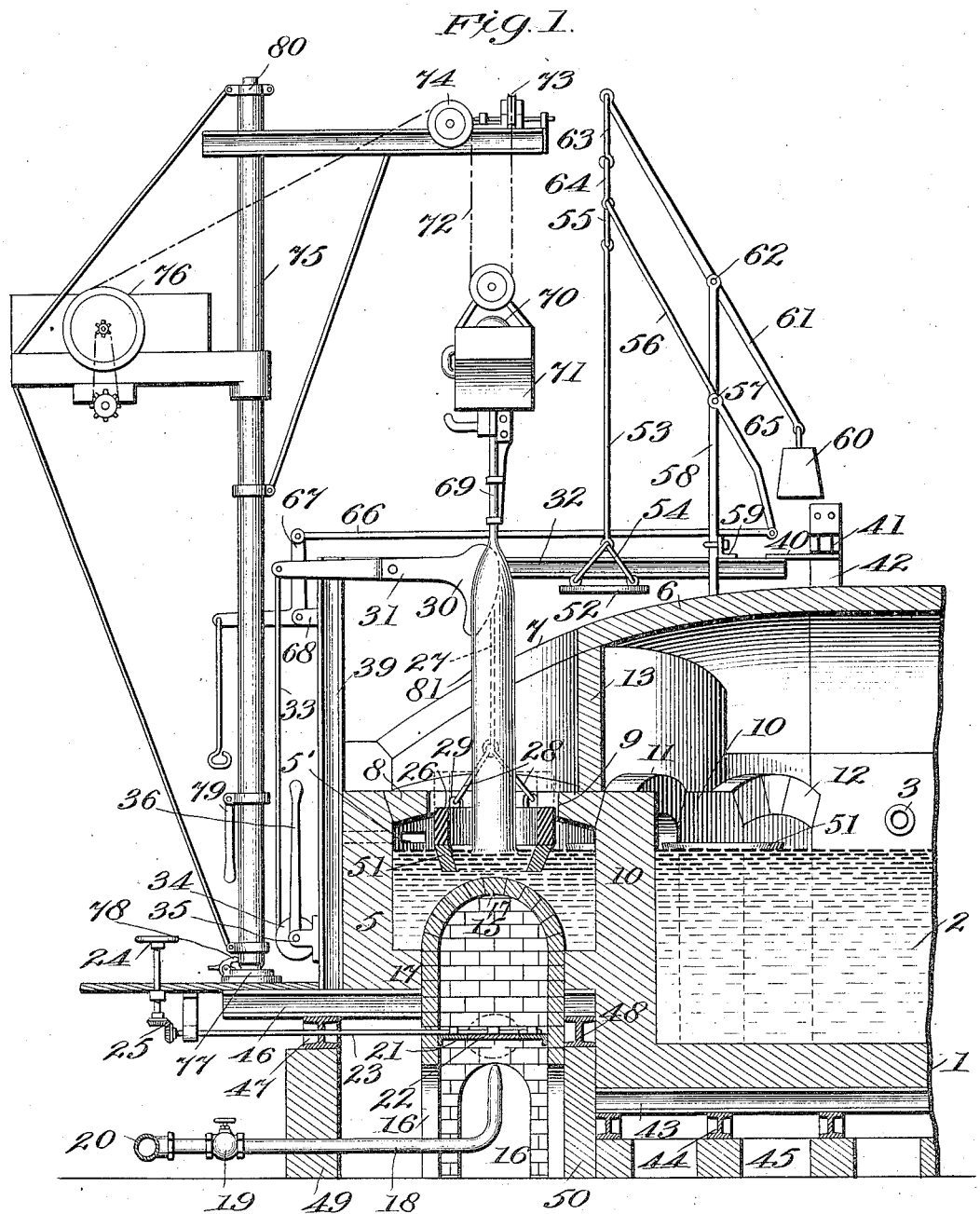

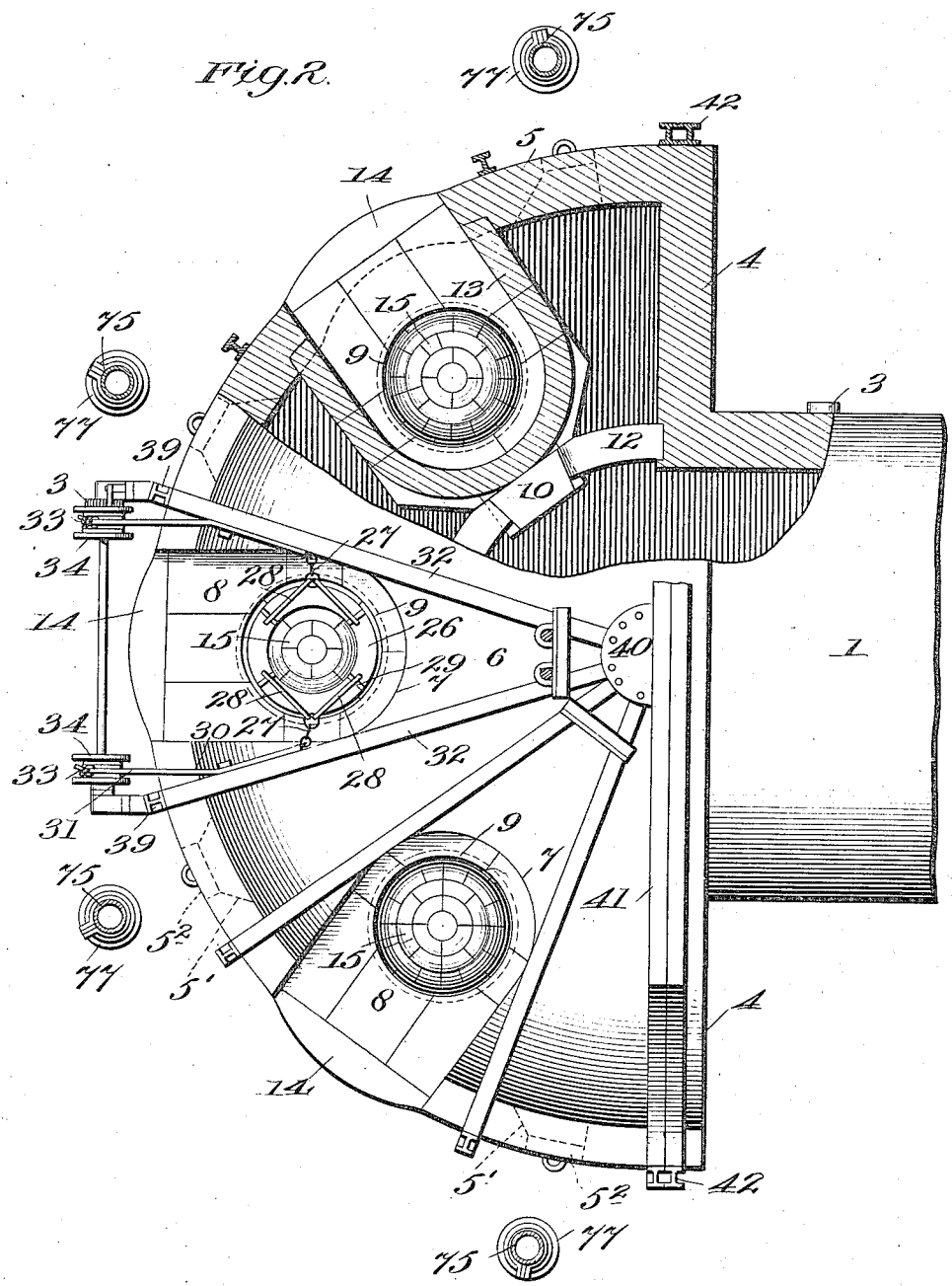

UNITED STATES PATENT OFFICE.

RICHARD H. BOLIN, OF KANE, PENNSYLVANIA, ASSIGNOR, BY MESNE ASSIGNMENTS, TO CONSOLIDATED MACHINE COMPANY, OF BRADFORD, PENNSYLVANIA, A CORPORATION OF DELAWARE.

GLASS-DRAWING FURNACE.

1,163,585.      Specification of Letters Patent.      Patented Dec. 7, 1915.

Application filed March 22, 1909. Serial No. 484,893.

*To all whom it may concern:*

Be it known that I, RICHARD H. BOLIN, citizen of the Dominion of Canada, residing at Kane, in the county of McKean and State of Pennsylvania, have invented certain new and useful Improvements in Glass-Drawing Furnaces, of which the following is a specification.

This invention relates to an improved process and apparatus for drawing hollow glass articles, such for example as hollow cylinders for window glass, by what is known as "machine glass drawing".

The primary object of this invention is to increase the speed of drawing, and to accomplish this the said invention is directed more especially to the establishing and maintenance of the proper temperature of the glass in the drawing zone, and to the arrangement and manipulation of certain accessories, so that both time and labor are saved. These and further objects will more fully appear from the following description in which reference will be had to the accompanying drawings which show a form of apparatus embodying my said invention, and wherein, Figure 1, is a fragmentary sectional view of one end of a glass tank and accessories, showing in elevation drawing apparatus in the act of drawing a cylinder from the glass in said tank; Fig. 2, a top plan view, partly in section, of the tank shown in Fig. 1, with some of the accessories removed; Fig. 3, a fragmentary front elevation of the parts shown in Fig. 2; Fig. 4, a detail perspective view of one of the floating rings; Fig. 5, a perspective view of lever mechanism for hoisting the covers from the vertically movable drawing rings, and Fig. 6, a side elevation, partly in section, of a modified form of floating ring.

Referring to the accompanying drawings, 1 represents the glass tank containing molten glass 2, the heat for which may be supplied through burners 3 in the usual way, or the heat may be supplied in any other desired way. Except as to that portion of the tank where the drawing takes place, this tank may be of any desired construction, but as to the drawing portion it is of novel construction especially adapted for the carrying out my improved process. The tank shown is constructed by building out from the side walls of the main heating chamber, wing walls 4, which are joined at their outer edges by an end wall 5 built approximately on the arc of a circle. The nose thus formed is provided with a dome-like curved top 6, in which are made a series of substantially horse shoe shaped openings 7 of any desired number. In the nose of the tank are a series of more or less flat top stone arches or bridges 8 of refractory material, arranged beneath the respective openings 7, and each of these bridges is itself provided with a central opening 9 passing through it. These bridges 8 are supported at their outer ends upon the front wall 5 of the tank and at their inner ends each upon a separate pier of a series of refractory piers 10. These piers are braced by arches 11 extending from pier to pier and by arches 12 extending from the end piers to the side walls of the tank. The space above the openings 9 in the bridges 8 is walled in back and sides by walls or shades 13 of suitable refractory material. The front wall 5 of the tank is bulged out as at 14 opposite each of the glass drawing openings, the said bulge taking a curvature substantially concentric with the curvature of the glass drawing opening and extending down preferably to the bottom of the tank. The object of giving the wall of the tank a curvature as at 14 is to effect uniformity in the temperature of the glass in the drawing zone by having the wall substantially the same distance from the center of the drawing zone along the front of the tank. Extending through the wall 5 at suitable intervals are skimming openings 5' which may be closed by refractory blocks $5^2$ inserted in them or may be provided with any other suitable device.

Beneath each of the glass drawing openings 9 is a hollow refractory dome 15, extending upward from the bottom of the tank in the area between the wall 5 and the piers 10 and extending downward a suitable distance, where they open to the outside atmosphere as through openings 16. In the tank illustrated this portion 17 of its bottom is shown elevated above the other portion of the tank bottom. I do not, however, limit my invention to such a construction. The object of the domes 15 is to produce a cooling effect on the glass in the drawing zones by cooling the glass in said zones from within and beneath the surface of the glass in said zones. I do not, however, wish to be understood as limiting my invention to the specific means herein shown for accomplishing this. The domes 15 may be cooled by simply opening the interior of the dome to the relatively cool air on the outside through openings 16 in the dome, or by introducing cool air, water or other cooling agent from a pipe 18 which may be controlled by a valve 19 between the outlet and a supply main 20, one of such valves 19 for each dome; or, the cooling may be effected in any other desired way. In order to regulate the temperature within the domes each may be provided with any suitable kind of damper. The one which I have shown in Fig. 1, consists simply of a plate 21 having a central opening in which is mounted a valve plate 22 mounted fast on a rod 23 which may have axial rotary motion imparted to it from a hand wheel 24 geared to the rod as at 25. This valve plate is shown open in dotted lines in Fig. 1.

Mounted in each of the openings 9 is a refractory ring 26 normally supported for vertical movement. These rings may be supported in any desired way, though I prefer in the present instance to suspend them so that they may be raised and lowered at will. The arrangement which I have shown for supporting these rings consists in suspending each ring from two cables 27 which are attached by suitable links 28 to refractory lugs 29 on the rings, and pass over sectors 30 of levers 31 fulcrumed on I-beams 32. The power arms of these levers are connected to cables 33 which wind on drums 34 carried by the shaft 35 journaled in any suitable way down near the front of the tank. The cables 33 may be wound and unwound on the drums 34 by means of a lever 36 made fast to the shaft 35. These drums may be held against rotation by means of ratchet 37 and pawl 38. The beams 32 are supported at their outer ends by upright beams 39, and their inner ends are made fast in any suitable way, as by means of a bracket 40, to a pair of horizontal I-beams 41 which extend across the top of the tank and which are secured at their ends to upright beams 42 at the side of the tank. The particular way of bracing and supporting the tank and beams, however, does not form any part of my present invention. In the drawings I have shown the lower portion of the tank supported upon longitudinal I-beams 43 carried upon cross I-beams 44 supported upon suitable masonry 45; and the drawing end of the tank supported upon radial I-beams 46 carried upon cross I-beams 47 and 48 mounted upon suitable masonry 49 and 50.

Adapted to coöperate with the vertically movable rings 26 are a plurality of floating refractory rings 51. These rings are of such buoyancy that their upper edge floats slightly above the upper level of the glass in the tank and so that in the drawing position the horizontal plane of their lower edge will be a few inches above the top of the cooling dome. These rings are preferably so constructed that the opening through which the glass enters them from the bottom is smaller than the opening in the top of the ring. In the ring shown in Fig. 1 and Fig. 4 this is effected by making the inner wall of the ring tapered. The outer wall of the ring may partake of a curvature concentric with the inner wall, or, if desired, the outer wall may be vertical and the inner wall slanting as shown in Fig. 6. In this latter form there is a greater mass of refractory material at the bottom of the ring than at its upper edge, thus permitting of a greater cooling of the glass as it enters the ring, the object of the said ring with a smaller opening at its bottom than at its top being to cause the glass within the ring to enter at a relatively contracted opening and then spread out and thus become relatively cool. I do not, however, limit my invention, except where specifically claimed, to the use of floating rings of the kind described. For example in some cases it may suffice to have the inner diameter of these rings uniform as in the case of the suspended rings 26.

For each of the rings 26, is provided a removable cover plate 52 of refractory material, each of which, in the case shown, is suspended by a cable or rod 53 secured at one end through suitable links 54 to lugs on the plate 52, and at its other end to a frame 55 loosely secured to the yoke of a U-shaped frame 56, the arms of which are made fast to a shaft 57 mounted to turn in uprights 58—58 secured in any suitable way to angle irons 59. The cover 52 is counterbalanced by a weight 60 secured to one end of a lever 61 fulcrumed on shaft 62 mounted in the upper ends of uprights 58, the other end of said lever being connected through links 63 and 64 to the yoke of frame 56. By thus counterbalancing the cover plate 52 very little power is required to raise it. For the purpose of operating this mechanism to raise and lower the covers 52, I make fast to the shaft 57 a lever 65 and connect this by a rod 66 to a bell crank lever 67 fulcrumed in a bracket 68 secured to one of the uprights 39.

The cylinder blowing and hoisting mechanism may be of any desired kind, though preferably of the kind indicated wherein the air is supplied to the blow pipe 69 from a rotary blower 70 operated by an electric motor (not shown) geared thereto and wherein the said blow pipe, blower and motor are all supported upon the carriage 71 freely suspended by a cable 72 which passes over pulleys 73 and 74 on the boom of a rotatable crane 75 and thence to a hoisting mechanism 76 carried by said crane, all substantially as shown and described in my application for U. S. Letters Patent, Serial Number 436,283, filed June 2, 1908. The speed of the blower motor, as well as that of the hoisting mechanism, may be controlled electrically as set forth in said application, or in any other suitable way. The vertical mast of the crane may be pivoted in any suitable bearing 77, and when in the drawing position may be held in proper position by a latch 78, or in any other suitable way. The crane may be rotated manually by means of a lever or arm 79 or in any other suitable way. The upper end of the crane is supported in a journal bearing 80 which may be stayed by guy wires or in any other suitable way.

The operation of drawing a cylinder is as follows:—The temperature of domes 15 having been adjusted, the cover plate 52 is raised to the position shown in Fig. 1, and the ring 26 lowered to register with a floating ring 51 which has been brought into position directly above a given dome 15, and the blower motor having been started up, the crane 75 is turned so that the blow pipe will be over the center of the drawing opening 9, and the hoisting mechanism is caused to operate so as to lower the blower carriage. This lowering is kept up until the bait of the blow pipe passes a suitable distance into the molten glass, when the hoisting mechanism is reversed, and the blow pipe carriage is started upward, continuing this motion until the cylinder 81 has reached the desired length. The cylinder is then severed in any desired way near its lower end from the portion extending into the molten glass. The crane with the cylinder suspended from the blow pipe is then swung around so that the depending cylinder will clear the tank, after which said cylinder may be taken down and "capped off" in any desired way. As soon as the cylinder has been severed at its lower end from the portion extending into the molten glass, an attendant by operating lever 36 raises ring 26 to the dotted line position shown in Fig. 1, more or less, and lowers the cover plate 52 to position on top of said ring. Then an attendant removes the closure 5² from skimming opening 5', inserts a long rod or other tool through said opening and with this pushes the floating ring 51 used in said draw, together with the relatively cool glass within and adhering to said ring, out to one side of the drawing zone into a zone of more highly heated glass where said relatively cooler glass becomes heated to normal. Several of these rings may be arranged around the pier opposite a given drawing zone so that they may be brought by rotation into the drawing position. In this way, by the time a ring is ready to be brought into the drawing position the semi-cooled glass which adhered to it at the end of the draw will have entirely melted and the glass within said ring brought up to the desired temperature. Just before the floating ring is brought into the drawing position above the dome, the glass within it is skimmed to remove any possible foreign or improperly heated matter. When a floating ring is thus brought into the drawing position, the cover plate 52 is raised, the ring 26 lowered and the drawing repeated as described.

Obviously any desired number of floating rings may be used for each drawing opening.

It will be seen from the foregoing description that the glass from which the cylinders are formed is drawn from a mass of relatively cool glass within a bath of more highly heated glass, and by the arrangement which I have provided for producing this cooled area, the drawing takes place all the while from relatively cooled glass without allowing the cooled glass at the drawing point to be replaced while the drawing is in progress by relatively hot glass. By thus maintaining this relatively cooled batch of glass I am enabled to draw much faster than hitherto has been possible.

Without limiting myself to the specific instrumentalities and method described, what I claim is:

1. A glass tank of the class described, having a plurality of refractory piers extending upward from its bottom and spaced apart transversely of said tank near the drawing end thereof, the bottom of said tank within the area embraced between said line of piers and said drawing end wall being provided with one or more concavo-convex refractory projections closed at the top extending upward into the body of the glass and adapted to relatively cool an area of said glass from below the glass drawing level.

2. A glass tank having a plurality of refractory piers extending upward from its bottom and spaced apart transversely of said tank near the drawing end thereof, a plurality of refractory bridges extending from said piers to the wall of the tank at its drawing end, said bridges each provided with an opening through which articles may be drawn from the glass in said tank, the bottom of said tank being provided with a refractory projection beneath each drawing opening, whereby the glass in the tank below said openings will be cooled.

3. A glass drawing tank of the class described containing a bath of molten glass, means to create in said glass a plurality of drawing zones of glass of relatively reduced temperature, the wall of said tank adjacent said drawing zones having a series of outward bulges or concavities one opposite each of said zones, substantially as described.

In testimony whereof I affix my signature in presence of two witnesses.

RICHARD H. BOLIN.

Witnesses:
H. K. Shaffer,
H. E. Shaffer.